Patented Jan. 11, 1938

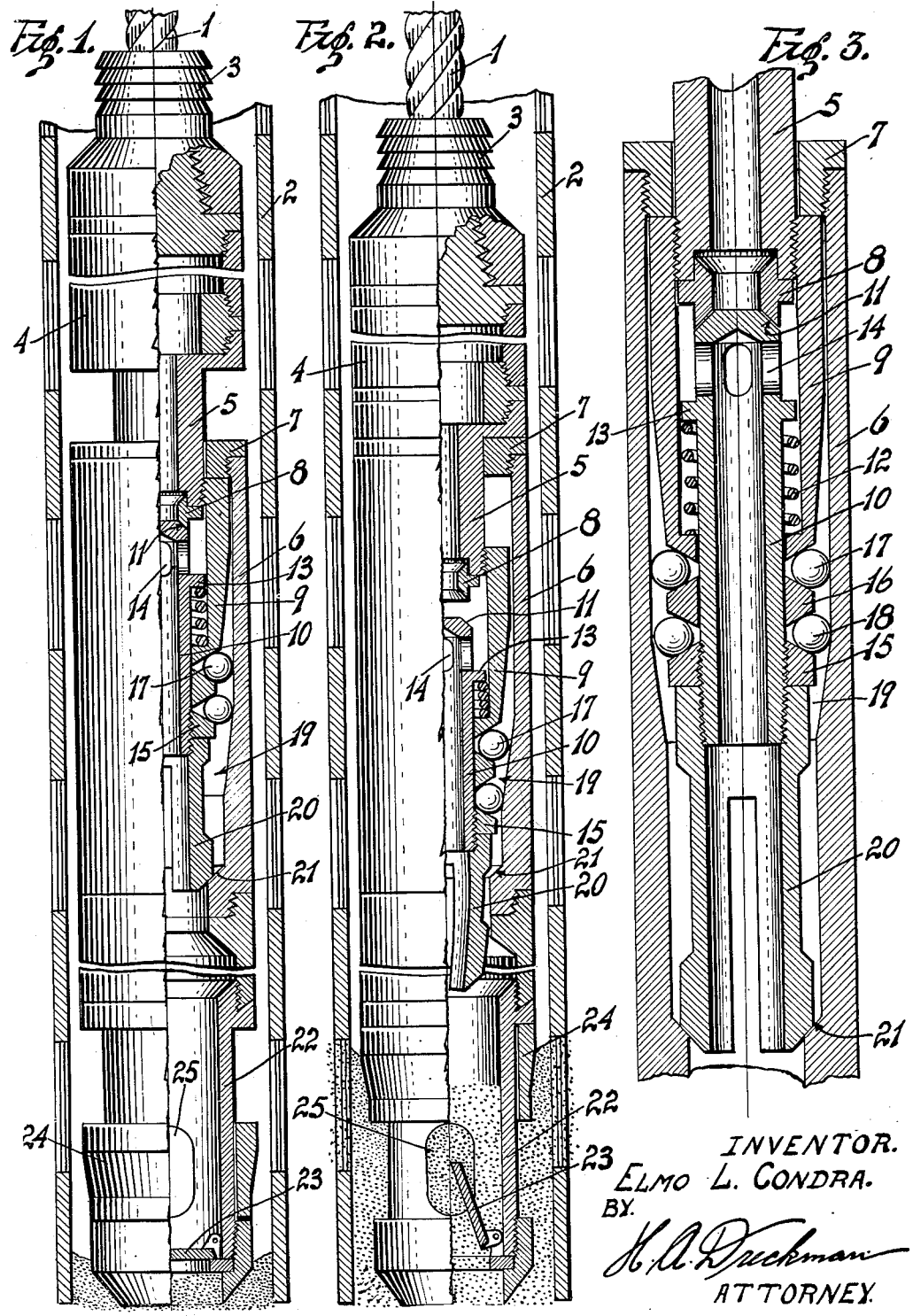

2,104,942

UNITED STATES PATENT OFFICE 2,104,942

PRESSURE BAILER

Elmo L. Condra, Long Beach, Calif.

Application January 13, 1936, Serial No. 58,797

7 Claims. (Cl. 166—19)

This invention relates to a pressure bailer of the type wherein a difference in pressure is maintained between the inside of the bailer and the outside thereof until a valve is released while the bailer is in the well, whereupon the pressures are equalized inside and outside of the bailer, and fluid and detritus is carried into the bailer at the time the pressures are equalized.

An object of my invention is to provide a novel means of opening a valve between upper and lower chambers in a bailer whereby a chamber under reduced pressure is open to the higher pressure within the well.

Another object is to provide a novel means of yieldably retaining the valve on its seat while the bailer is being run into the well.

Still another object is to provide a novel bailer bottom whereby the bailer is prevented from becoming stuck in the well.

A further object is to provide a bailer of the character stated which is simple in construction and effective in operation.

Other objects, advantages and features of invention may appear from the accompanying drawing, the subjoined detailed description, and the appended claims.

In the drawing:

Figure 1 is a longitudinal quarter sectional view of my bailer in closed position.

Figure 2 is a view similar to Fig. 1, showing the bailer in open position.

Figure 3 is a fragmentary longitudinal sectional view of the valve releasing and yieldable retaining means of the bailer.

Referring more particularly to the drawing, my bailer is preferably run into a well on a cable or sand line 1. The tool may be operated in the casing, as shown at 2, or it may be operated in an open hole, if desired.

A socket 3, of usual and well known construction, is provided at the top of the bailer, and the cable 1 is attached thereto. The socket 3 preferably screws onto the top of the bailer, altho other fastening means may be used, if desired. The casing 4—of suitable length—forms the upper or pressure chamber and this chamber is closed at the top. A pipe section 5 of reduced diameter depends from the casing 4 and this pipe section is slidably mounted in the lower tubing 6. A nut 7 screws into the top of the tubing and closely surrounds the pipe section 5, thus providing a guide for the pipe, as well as a stop, as will be further described.

A valve seat 8 is fixedly attached in the bottom of the pipe 5 the purpose of which will be further described.

A valve cage 9 screws onto the outside of the pipe 5 and shoulders against the nut 7 in the closed position of the bailer, as shown in Figs. 1 and 3.

A tubular conduit 10 is slidably mounted in the cage 9 and is of lesser diameter than the inside diameter of the cage. The top of the conduit is tapered to form a valve to rest upon the seat 8, as shown at 11. A coil spring 12 bears against the shoulder 13 of the conduit, thereby yieldably pressing the valve against the seat 8. A plurality of ports 14 are provided adjacent the upper end of the conduit 10 and these ports are positioned below the valve 11. Thus, when the valve 11 is seated, there is no opening from the conduit into the pipe 5 and thence to the pressure chamber in the casing 4.

A collar 15 is provided adjacent the lower end of the conduit 10 and a spacing ring 16 loosely encircles the conduit above the collar 15. Between the ring 16 and the bottom of the cage 9, I provide a row of balls 17. Between the ring 16 and the collar 15, I provide a second row of balls 18. It is to be noted that the lower surface of the cage 9, the upper and lower surfaces of ring 16 and the upper surface of the collar 15 are tapered. The balls 17, 18 thus bear against tapered surfaces, and in the closed position of the bailer will be pressed outwardly, as shown in Figs. 1 and 3.

A cam surface 19 is provided on the inside of the tubing 6 immediately below the lower row of balls 18, the purpose of which will be further described.

A spring catcher 20 is attached to the bottom of the conduit 10 and the lower end of this catcher rests upon a tapered seat 21 in the tubing 6. The spring catcher 20 normally presses outwardly and therefore, the bottom thereof will rest upon the seat 21 when the valve 11 is closed. This arrangement is shown in Figs. 1 and 3. This catcher prevents the valve 11 from being accidentally unseated while the tool is being run into the hole. When the parts of the bailer are not telescoped, a distinct jar will be necessary to unseat the catcher 20, whereupon the parts will telescope, as will be further described.

A bailer bottom is attached to the lower end of my bailer and consists of a bill 22 which extends into the formation and thru which the material is drawn into the bailer. A flap valve 23 is mounted within the bill adjacent the lower end thereof for the purpose of retaining material in the bailer.

When the bailer is in operation, the bill will tend to bore into the sand or the like, and will tend to stick. To overcome this tendency, I provide a sleeve 24 which is slidable on the bill 22. As the bill sets into the sand, the sleeve 24 will be pushed upwardly, as shown in Fig. 2, to expose side ports 25. When these side ports are exposed, sand will be drawn in at the side of the bill, thereby effectively preventing the sticking of the bailer in the well.

In operation, the parts of the bailer are first extended, as shown in Figs. 1 and 3. When the bottom of the bill 22 strikes a bridge or bottom of a hole, the bailer will be slightly raised and then dropped. This jar unseats the catcher 20 from its seat 21 and the pipe 5 will telescope in the tube 6. The cage 9 being secured to the pipe 5, will move downwardly, and the balls 17, 18 will engage the tapered surface 19. The balls will thus be cammed inwardly. The inward movement of the balls against the tapered surface of the parts 15 and 16 will press the conduit 10 downwardly against the tension of the spring 12. This will unseat the valve 11 and the pressure chamber in the casing 4 will be opened, whereby the pressures will be balanced between the inside of the casing 4 and the outside of the bailer, causing a rapid movement of liquid and detritus into the bailer. Sand and other heavy particles will be retained in the bailer bottom and in the tubing 6. The liquid will pass upwardly thru the ports 14 past the valve seat 8, thence thru the pipe 5 and into the casing 4.

Having described my invention, I claim:

1. A bailer comprising a casing, a tube, said casing and tube being telescopically joined together, a conduit, said conduit being closed at the top and seated against the lower end of the casing whereby a valve is provided between the casing and tube said conduit being within the tube, spring means urging the conduit against the casing, a tapered surface in the tube, balls mounted around the conduit, a cooperating surface on the conduit engaged by the balls, said balls being movable transversely of the conduit when engaging the tapered surface, whereby the conduit is moved off of its seat.

2. A bailer comprising a casing, a tube, said casing and tube being telescopically joined together, a conduit, said conduit being closed at the top and seated against the lower end of the casing whereby a valve is provided between the casing and tube said conduit being within the tube, spring means urging the conduit against the casing, a tapered surface in the tube, balls mounted around the conduit, a cooperating surface on the conduit engaged by the balls, said balls being movable transversely of the conduit when engaging the tapered surface whereby the conduit is moved off of its seat, and releasable means holding the conduit on its seat.

3. A bailer comprising a casing, a tube, said casing and tube being telescopically joined together, a conduit, said conduit being closed at the top and seated against the lower end of the casing whereby a valve is provided between the casing and tube said conduit being within the tube, spring means urging the conduit against the casing, a tapered surface in the tube, balls mounted around the conduit, a cooperating surface on the conduit engaged by the balls, said balls being movable transversely of the conduit when engaging the tapered surface whereby the conduit is moved off of its seat, and a catcher mounted on the conduit, said catcher being releasably seated in the tube whereby the conduit is releasably held on its seat.

4. A bailer comprising an upper casing, a tube, said casing and tube being telescopically joined together, a conduit closed at the top and seated against the lower end of the casing whereby a valve is provided between the casing and tube, said conduit being within the tube, a spring yieldably pressing the conduit against the seat, a cage mounted on the casing, said conduit being slidable in the cage, a collar on the conduit, balls arranged between the cage and the collar, a tapered surface in the tube, a cooperating surface on the conduit engaged by the balls, said balls being adapted to engage the tapered surface whereby the balls are cammed inwardly and the conduit is unseated.

5. A bailer comprising an upper casing, a tube, said casing and tube being telescopically joined together, a conduit closed at the top and seated against the lower end of the casing whereby a valve is provided between the casing and tube, said conduit being within the tube, a spring yieldably pressing the conduit against the seat, a cage mounted on the casing, said conduit being slidable in the cage, a collar on the conduit, balls arranged between the cage and the collar, a tapered surface in the tube, a cooperating surface on the conduit engaged by the balls, said balls being adapted to engage the tapered surface whereby the balls are cammed inwardly and the conduit is unseated, a catcher mounted on the lower end of the conduit, a seat in the tube on which the catcher rests, said catcher being releasable from the seat whereby the casing and tube may telescope.

6. A bailer comprising an upper casing, a tube, said casing and tube being telescopically joined together, a conduit closed at the top and seated against the lower end of the casing whereby a valve is provided between the casing and tube, said conduit being within the tube, a cage mounted on the casing, a spring within the cage, said spring yieldably pressing the conduit against its seat, said conduit being slidable in the cage, a collar on the conduit, said collar having a tapered surface thereon, a tapered surface in the tube, balls arranged between the cage and the collar, and bearing against the tube, said balls being adapted to engage the tapered surface whereby the balls are cammed inwardly, said cage having a tapered surface on the bottom thereof against which the balls bear, said balls as they are moved inwardly unseating the conduit against the tension of said spring.

7. A bailer comprising an upper casing, a tube, said casing and tube being telescopically joined together, a conduit closed at the top and seated against the lower end of the casing whereby a valve is provided between the casing and tube, said conduit being within the tube, a cage mounted on the casing, a spring within the cage, said spring yieldably pressing the conduit against its seat, said conduit being slidable in the cage, a collar on the conduit, said collar having a tapered surface thereon, a tapered surface in the tube, balls arranged between the cage and the collar and bearing against the tube, said balls being adapted to engage the tapered surface whereby the balls are cammed inwardly, said cage having a tapered surface on the bottom thereof against which the balls bear, said balls as they are moved inwardly unseating the conduit against the tension of said spring, and releasable means on the conduit engaging the tube whereby the conduit is held on its seat.

ELMO L. CONDRA.